(12) United States Patent
Rezaei Jegarluei et al.

(10) Patent No.: US 10,916,936 B2
(45) Date of Patent: Feb. 9, 2021

(54) CIRCUIT BREAKER FAILURE PROTECTION IN A POWER SUBSTATION

(71) Applicants: Mohammad Rezaei Jegarluei, Tehran (IR); Sina Moatar Rashkhari, Tehran (IR); Nader Kayvan, Tehran (IR); Mohammad Nabi Faraji, Tehran (IR)

(72) Inventors: Mohammad Rezaei Jegarluei, Tehran (IR); Sina Moatar Rashkhari, Tehran (IR); Nader Kayvan, Tehran (IR); Mohammad Nabi Faraji, Tehran (IR)

( * ) Notice: Subject to any disclaimer, the term of this patent is extended or adjusted under 35 U.S.C. 154(b) by 331 days.

(21) Appl. No.: 16/150,510

(22) Filed: Oct. 3, 2018

(65) Prior Publication Data

US 2019/0036329 A1    Jan. 31, 2019

Related U.S. Application Data

(60) Provisional application No. 62/567,782, filed on Oct. 4, 2017.

(51) Int. Cl.
*H02H 7/26* (2006.01)
*H02H 3/44* (2006.01)
(Continued)

(52) U.S. Cl.
CPC .......... *H02H 7/268* (2013.01); *H02H 3/044* (2013.01); *H02H 3/087* (2013.01); *H02H 3/202* (2013.01);
(Continued)

(58) Field of Classification Search
CPC ........ H02H 7/268; H02H 3/044; H02H 3/087; H02H 3/202; H02H 3/445; H02H 7/222; H02H 7/262; H02H 7/30; H02H 3/033
See application file for complete search history.

(56) References Cited

U.S. PATENT DOCUMENTS 9,042,071 B2    5/2015  Berggren et al.
2003/0151867 A1*  8/2003  Kase ............... H02H 3/081
                                              361/77
(Continued)

FOREIGN PATENT DOCUMENTS

CN        105186464        2/2018

OTHER PUBLICATIONS

Rifaat et al. "Bus and Breaker Fail Protection for Industrial and Commercial Power Systems Part II: Breaker Fail Protection and Conclusion Working Group Report." In Industry Applications Conference, 2007. 42nd IAS Annual Meeting. Conference Record of the 2007 IEEE, pp. 898-903. IEEE, 2007.
(Continued)

*Primary Examiner* — Kyle J Moody
*Assistant Examiner* — Lakaisha Jackson
(74) *Attorney, Agent, or Firm* — Bajwa IP Law Firm; Haris Zaheer Bajwa

(57) ABSTRACT

A method for circuit breaker failure (CBF) protection in a power substation is disclosed. The power substation includes a first circuit breaker (CB), a second CB coupled to the first CB, a feeder coupled to the first CB and the second CB, a power plant coupled to the feeder, a first plurality of CBs coupled to the first CB, and a second plurality of CBs coupled to the second CB. The method includes sending a first stage tripping command to the first CB and the second CB to trip the first CB and the second CB responsive to a non-high current tripping command being active for a first period of time, and one of a current condition and an energization condition being satisfied for the first period of time, sending a first second-stage tripping command to the first plurality of CBs to trip the first plurality of CBs responsive to the non-high current tripping command being active for a second period of time, and one of the current (Continued)

condition and the energization condition being satisfied for the second period of time, and sending a second second-stage tripping command to the second plurality of CBs to trip the second plurality of CBs responsive to the non-high current tripping command being active for a third period of time, and one of the current condition and the energization condition being satisfied for the third period of time. The second period of time and the third period of time may be longer than the first period of time.

20 Claims, 6 Drawing Sheets

(51) Int. Cl.
      *H02H 7/22*          (2006.01)
      *H02H 3/04*          (2006.01)
      *H02H 7/30*          (2006.01)
      *H02H 3/20*          (2006.01)
      *H02H 3/087*        (2006.01)
      *H02H 3/033*        (2006.01)
(52) U.S. Cl.
      CPC ............ *H02H 3/445* (2013.01); *H02H 7/222* (2013.01); *H02H 7/262* (2013.01); *H02H 7/30* (2013.01); *H02H 3/033* (2013.01)

(56) References Cited

U.S. PATENT DOCUMENTS

| | | | |
|---|---|---|---|
| 2008/0158752 A1* | 7/2008 | Hill ........................... | H02H 7/30 361/64 |
| 2009/0290275 A1* | 11/2009 | Staszesky .............. | H02H 7/261 361/63 |
| 2017/0054291 A1* | 2/2017 | Qi ........................... | H02H 3/025 |
| 2017/0328945 A1* | 11/2017 | Achanta ................. | H02H 7/261 |
| 2018/0034258 A1* | 2/2018 | Schweitzer, III ........ | H02H 3/20 |
| 2018/0241199 A1* | 8/2018 | Morgan ................ | G05B 19/058 |
| 2019/0109451 A1* | 4/2019 | Takemura ................ | H02H 3/05 |

OTHER PUBLICATIONS

Aguirre "Main considerations in the protection system design for a geothermal power plant" (2011).

Hataway et al., "Improving Breaker Failure Protection for Generator Applications", proceedings of 65th Annual Georgia Tech Protective Relaying Conference, vol. 5, May 2011.

Xue et al. "Review of the breaker failure protection practices in utilities." In Protective Relay Engineers, 2012 65th Annual Conference for, pp. 260-268. IEEE, 2012.

* cited by examiner

CIRCUIT BREAKER FAILURE PROTECTION IN A POWER SUBSTATION

CROSS-REFERENCE TO RELATED APPLICATION

This application claims the benefit of priority from U.S. Provisional Patent Application Ser. No. 62/567,782, filed on Oct. 4, 2017, and entitled "BACKUP CIRCUIT BREAKER FAILURE PROTECTION LOGIC TO PREVENT GENERATORS FROM RUNNING AS MOTORS," which is incorporated herein by reference in its entirety.

TECHNICAL FIELD

The present disclosure generally relates to power systems, and particularly, to circuit breaker failure protection.

BACKGROUND

In power networks, protective relays play an important role in expeditiously detecting fault occurrence and issuing trip commands to appropriate circuit breakers (CB) by which, faulted parts of the network become disconnected from the remaining healthy parts. In high voltage power networks, it is common to assign an independent protective relay, called circuit breaker management relay (CBM), to monitor and manage CBs performance. A main logical function in CBM relays is a circuit breaker failure (CBF) protection function, which may detect faulty status of the CB which is not able to open or break the fault current after receiving a trip command. In such cases, a CBM relay may either issue a repetitive trip command to a problematic CB or other CBs in order to remove faulted section from the network.

In some cases, power plants may be connected to a power network via a power substation. In case of a fault occurring in the power plant, trip commands may be sent to CBs associated with the power plant. If these breakers turn out to be problematic and not able to effectively open, a CBF function in a CBM relay may detect this condition and issue repetitive trip commands to the faulty breakers. If the failure condition persists, the CBM relay may send trip commands to other adjacent CBs so that the power plant is finally disconnected form the network. However, in some actual cases, the CBs may fail to successfully open, and the power plant may remain connected to the network, which may inflict serious damage, in terms of high maintenance costs and even putting the power plant out of order. For example, if a non-high current fault, i.e., a failure causing a relatively low current flow compared with common high-current faults occurs in a power plant, the failure in connected CBs may not be detected, and the power plant may remain connected to the network causing generators in the power plant to run as motors due to the current flow. This may considerably damage the power plant.

There is, therefore, a need for a method for CBF failure protection that utilizes different parameters from those in regular CBF functions to minimize the probability of malfunction. There is also a need for a circuit for CBF failure protection that utilizes different relays from those associated with regular CBF functions, so that in case of an internal failure in main relays, the circuit remains operative. There is further a need for a simple and cost-efficient circuit that can be implemented on conventional protective relays so that existing protection systems can be equipped with a CBF protection circuit without a major modification.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for circuit breaker failure (CBF) protection in a power substation. The power substation may include a first circuit breaker (CB), a second CB coupled to the first CB, a feeder coupled to the first CB and the second CB, a power plant coupled to the feeder, a first plurality of CBs coupled to the first CB, and a second plurality of CBs coupled to the second CB. The method includes sending a first stage tripping command to the first CB and the second CB to trip the first CB and the second CB responsive to a non-high current tripping command being active for a first period of time, and one of a current condition and an energization condition being satisfied for the first period of time, sending a first second-stage tripping command to the first plurality of CBs to trip the first plurality of CBs responsive to the non-high current tripping command being active for a second period of time, and one of the current condition and the energization condition being satisfied for the second period of time, and sending a second second-stage tripping command to the second plurality of CBs to trip the second plurality of CBs responsive to the non-high current tripping command being active for a third period of time, and one of the current condition and the energization condition being satisfied for the third period of time. The second period of time and the third period of time may be longer than the first period of time.

In an exemplary embodiment, the current condition may include a first current being larger than a current threshold. The first current may be associated with the feeder. In an exemplary embodiment, the current condition may include one of a first current, a second current, and a third current being larger than a current threshold. The first current, the second current, and the third current may be associated with a three-phase electric current, and the three-phase electric current may be associated with the feeder.

In an exemplary embodiment, the energization condition may include an excitation removal tripping command received from the power plant, and a first voltage being larger than a voltage threshold. The first voltage may be associated with the feeder. In an exemplary embodiment, the first period of time may be set higher than a dropping time of a terminal voltage of the power plant after the excitation removal tripping command is received from the power plant.

In an exemplary embodiment, the energization condition may include an excitation removal tripping command received from the power plant, and one of a first voltage, a second voltage, and a third voltage being larger than a voltage threshold. The first voltage, the second voltage, and the third voltage may be associated with a three-phase voltage, and the three-phase voltage may be associated with the feeder.

In an exemplary embodiment, the present disclosure describes an exemplary circuit for CBF protection in a power substation comprising a first CB, a second CB coupled to the first CB, a feeder coupled to the first CB and the second CB, a power plant coupled to the feeder, a first plurality of CBs coupled to the first CB, and a second plurality of CBs coupled to the second CB. The circuit includes a plurality of inputs, a plurality of outputs, a two-input OR gate, a first two-input AND gate, a first time-delay gate, a second time-delay gate, and a third time-delay gate. In an exemplary embodiment, the plurality of inputs may include a non-high current tripping input, an energization condition input, and a current condition input. In an exemplary embodiment, the plurality of outputs may include a first stage tripping output coupled to the first CB and the second CB, a first second-stage tripping output coupled to the first plurality of CBs, and a second second-stage tripping output coupled to the second plurality of CBs. In an exemplary embodiment, a first input of the two-input OR gate may be coupled to the energization condition input, and a second input of the two-input OR gate may be coupled to the current condition input. In an exemplary embodiment, a first input of the first two-input AND gate may be coupled to the non-high current tripping input, and a second input of the first two-input AND gate may be coupled to an output of the two-input OR gate. In an exemplary embodiment, the first time-delay gate may be configured to couple an output of the first two-input AND gate to a middle node responsive to the output of the first two-input AND gate remaining active for at least a time T1. The middle node may be coupled to the first stage tripping output. In an exemplary embodiment, the second time-delay gate may be configured to couple the middle node to the first second-stage tripping output responsive to the middle node remaining active for at least a time T2. In an exemplary embodiment, the third time-delay gate may be configured to couple the middle node to the second second-stage tripping output responsive to the middle node remaining active for at least a time T3.

In an exemplary embodiment, the current condition input may be activated responsive to a first current being larger than a current threshold. The first current may be associated with the feeder. The current threshold may be set in a range of about 4% to 6% of a nominal electric current of the power plant.

In an exemplary embodiment, the current condition input may be coupled to an output node of a first three-input OR gate. A first input of the first three-input OR gate may be coupled to a first Boolean input, and the first Boolean input may be activated responsive to a first current being larger than a current threshold. A second input of the first three-input OR gate may be coupled to a second Boolean input, and the second Boolean input may be activated responsive to a second current being larger than the current threshold. A third input of the first three-input OR gate may be coupled to a third Boolean input, and the third Boolean input may be activated responsive to a third current being larger than the current threshold. In an exemplary embodiment, the first current, the second current, and the third current may be associated with a three-phase electric current, and the three-phase electric current may be associated with the feeder.

In an exemplary embodiment, the energization condition input may be coupled to an output node of a second two-input AND gate. A first input of the second two-input AND gate may be coupled to an excitation removal tripping input, and a second input of the second two-input AND gate may be coupled to a voltage condition input. In an exemplary embodiment, the excitation removal tripping input may be activated responsive to an excitation removal tripping command received from the power plant, and the voltage condition input may be activated responsive to a voltage condition being satisfied.

In an exemplary embodiment, the voltage condition may include a first voltage being larger than a voltage threshold. The first voltage may be associated with the feeder. The voltage threshold may be set to 50 percent of a nominal value of a secondary voltage at a secondary terminal of a voltage transformer (VT) coupled to the feeder. The VT may be configured to measure a value of the first voltage.

In an exemplary embodiment, the voltage condition input may be coupled to an output node of a second three-input OR gate. A first input of the second three-input OR gate may be coupled to a fourth Boolean input, and the fourth Boolean input may be activated responsive to a first voltage being larger than a voltage threshold. A second input of the second three-input OR gate may be coupled to a fifth Boolean input, and the fifth Boolean input may be activated responsive to a second voltage being larger than the voltage threshold. A third input of the second three-input OR gate may be coupled to a sixth Boolean input, and the sixth Boolean input may be activated responsive to a third voltage being larger than the voltage threshold. In an exemplary embodiment, the first voltage, the second voltage, and the third voltage may be associated with a three-phase voltage, and the three-phase voltage may be associated with the feeder.

In an exemplary embodiment, the present disclosure describes an exemplary circuit for circuit breaker failure (CBF) protection in a power substation. The includes a first circuit breaker (CB), a second CB coupled to the first CB, a feeder coupled to the first CB and the second CB, a power plant coupled to the feeder, a first plurality of CBs coupled to the first CB, and a second plurality of CBs coupled to the second CB. The circuit includes a DC power supply, a non-high current switch, a current condition switch, a plurality of energization condition switches, and a first time-delay electromechanical relay. The first time-delay electromechanical relay may be coupled to a reference point. The circuit is configured to couple the DC power supply to the first time-delay electromechanical relay responsive to the non-high current switch turned on, and one of the current condition switch and the plurality of energization condition switches turned on.

In an exemplary embodiment, the first time-delay electromechanical relay may be configured to activate a first stage contactor responsive to the first time-delay electromechanical relay remaining coupled to the DC power supply for at least a time T1, couple the DC power supply to a second time-delay electromechanical relay by turning on a first time-delay switch responsive to the first time-delay electromechanical relay remaining coupled to the DC power supply for at least a time T1, and couple the DC power supply to a third time-delay electromechanical relay by turning on a second time-delay switch responsive to the first time-delay electromechanical relay remaining coupled to the DC power supply for at least a time T1. In an exemplary embodiment, the first stage contactor may be associated with the first CB and the second CB. The second time-delay electromechanical relay and the third time-delay electromechanical relay may be coupled to the reference point.

In an exemplary embodiment, the second time-delay electromechanical relay may be configured to activate a first second-stage contactor responsive to the second time-delay electromechanical relay remaining coupled to the DC power supply for at least a time T2. The first second-stage contactor may be associated with the first plurality of CBs.

In an exemplary embodiment, the third time-delay electromechanical relay may be configured to activate a second second-stage contactor responsive to the third time-delay electromechanical relay remaining coupled to the DC power supply for at least a time T3. The second second-stage contactor may be associated with the second plurality of CBs.

In an exemplary embodiment, the plurality of energization condition switches may include an excitation removal switch and a voltage-based switching mechanism coupled to the excitation removal switch. The excitation removal switch may be configured to turn on responsive to an excitation removal tripping command received from the power plant, and the voltage-based switching mechanism may be configured to turn on responsive to one of a first voltage-based switch, a second voltage-based switch, and a third voltage-based switch turning on. In an exemplary embodiment, the first voltage-based switch may be controlled by a first electromechanical relay. The first electromechanical relay may be configured to turn on the first voltage-based switch responsive to a first voltage of the first electromechanical relay becoming larger than a voltage threshold. In an exemplary embodiment, the second voltage-based switch may be controlled by a second electromechanical relay. The second electromechanical relay may be configured to turn on the second voltage-based switch responsive to a second voltage of the second electromechanical relay becoming larger than the voltage threshold. In an exemplary embodiment, the third voltage-based switch may be controlled by a third electromechanical relay. The third electromechanical relay may be configured to turn on the third voltage-based switch responsive to a third voltage of the third electromechanical relay becoming larger than the voltage threshold. In an exemplary embodiment, the first voltage, the second voltage, and the third voltage may be associated with a three-phase voltage, and the three-phase voltage may be associated with the feeder.

In an exemplary embodiment, the current condition switch may be controlled by a current-based relay. The current-based relay may be configured to turn on the current condition switch responsive to one of a first current, a second current, and a third current becoming larger than a current threshold. In an exemplary embodiment, the first current, the second current, and the third current may be associated with a three-phase electric current, and the three-phase electric current may be associated with the feeder.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and exemplary circuits for circuit breaker failure (CBF) protection in a power substation. The exemplary method detects the failure of circuit breakers (CBs) that are associated with a power plant connected to a power network via the powered substation. If the voltage or the current of the feeder of the power plant exceeds a given threshold and remains higher than the threshold for a given period of time, the exemplary method sends tripping commands to the CBs in two stages. The threshold may be set based on the nominal current or voltage of the power plant. At a first stage of the two stages, tripping commands may be sent to a first group of CBs that may be directly connected to the feeder of the power plant. If the voltage or the current remains high after sending the first stage tripping commands, second-stage tripping commands may be sent to a second group of CBs, i.e., the CBs that are connected to the first group of CBs. As a result, if the CBs that may be directly associated with the power plant fail to disconnect the power plant from the power network, the power plant may be disconnected by other CBs that may be indirectly coupled to the power plant.

Figure 1:
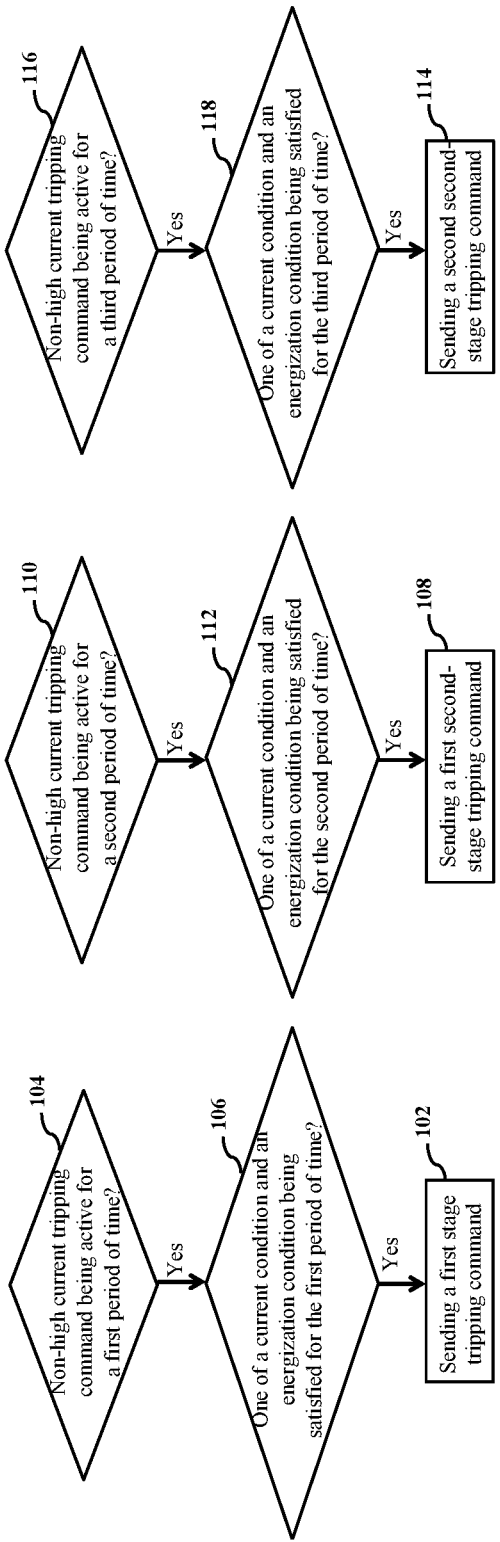
FIG. 1 shows a flowchart of an exemplary method for circuit breaker failure (CBF) protection in a power substation, consistent with one or more exemplary embodiments of the present disclosure.
Figure 2:
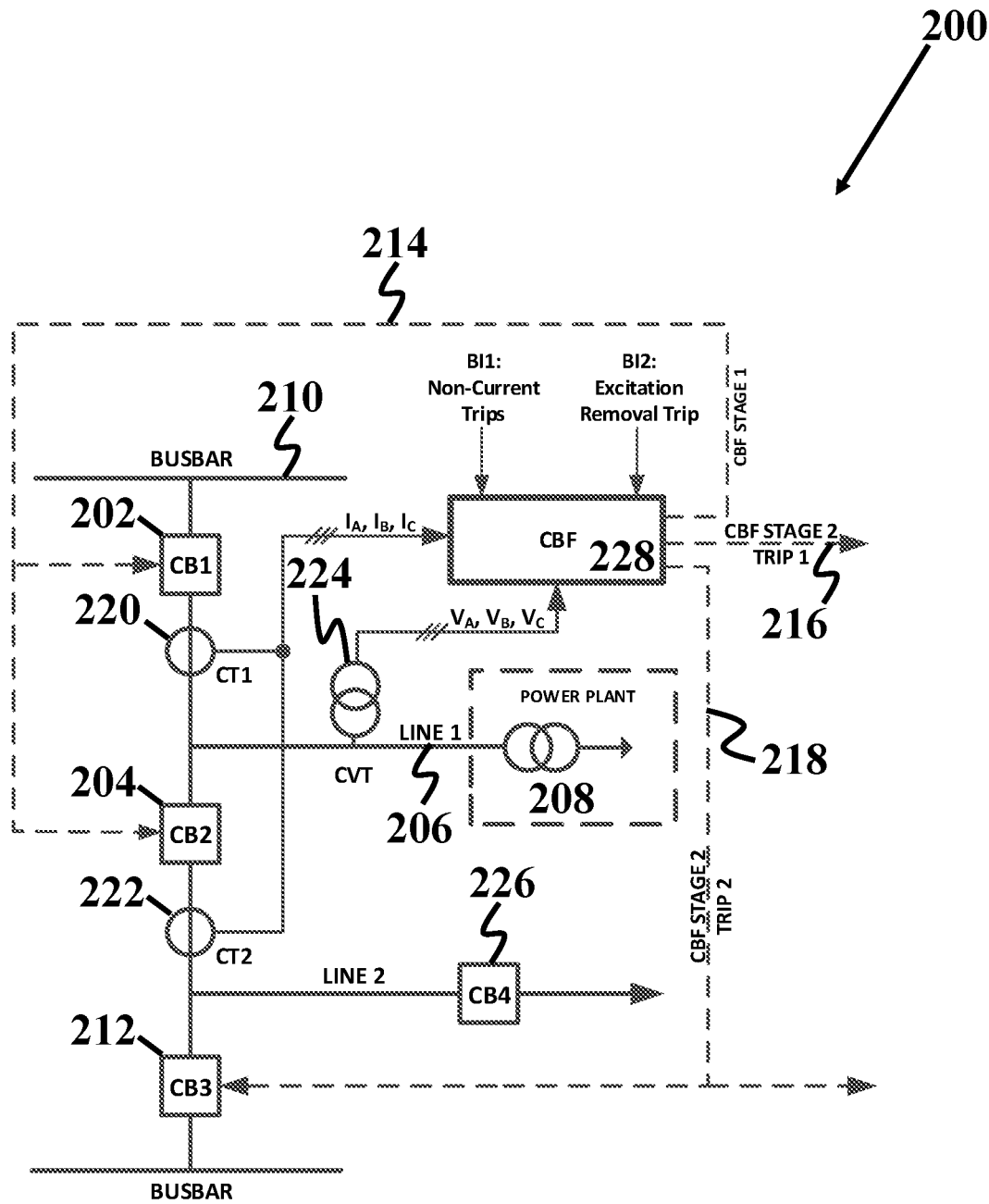
FIG. 2 shows a schematic of an exemplary power substation, consistent with one or more exemplary embodiments of the present disclosure.

FIG. 1 shows a flowchart of exemplary method 100 for circuit breaker failure (CBF) protection in a power substation, consistent with one or more exemplary embodiments of the present disclosure. FIG. 2 shows a schematic of an exemplary power substation 200, consistent with one or more exemplary embodiments of the present disclosure. In an exemplary embodiment, power substation 200 may include a first circuit breaker (CB) 202, a second CB 204 coupled to the first CB 202, a feeder 206 coupled to first CB 202 and second CB 204, a power plant 208 coupled to feeder 206, a first plurality of CBs coupled to first CB 202 (for example, via a first busbar 210 in FIG. 2), and a second plurality of CBs coupled to second CB 204 (represented by an exemplary third CB 212 and an exemplary fourth CB 226 in FIG. 2).

Referring to FIGS. 1 and 2, in an exemplary embodiment, method 100 may include sending a first stage tripping command 214 to first CB 202 and second CB 204 to trip first CB 202 and second CB 204 (step 102) responsive to a non-high current tripping command $Bl_1$ being active for a first period of time t1 (step 104, yes), and one of a current condition and an energization condition being satisfied for first period of time t1 (step 106, yes), sending a first second-stage tripping command 216 to the first plurality of CBs to trip the first plurality of CBs (step 108) responsive to non-high current tripping command $Bl_1$ being active for a second period of time t2 (step 110, yes), and one of the current condition and the energization condition being satisfied for second period of time t2 (step 112, yes), and sending a second second-stage tripping command 218 to the second plurality of CBs to trip the second plurality of CBs (step 114) responsive to non-high current tripping command $Bl_1$ being active for a third period of time t3 (step 116, yes), and one of the current condition and the energization condition being satisfied for third period of time t3 (step 118, yes). In an exemplary embodiment, second period of time t2 and third period of time t3 may be longer than first period of time t1.

In an exemplary embodiment, the current condition may include a first current $I_A$ being larger than a current threshold $I_{CBF}$. First current $I_A$ may be associated with feeder 206. In an exemplary embodiment, the current condition may include one of first current $I_A$, a second current $I_B$, and a third current $I_C$ being larger than current threshold $I_{CBF}$. In an exemplary embodiment, current threshold $I_{CBF}$ may be set to about 5% of a nominal electric current of the power plant, which may be a relatively small value, for example about 60 A in a 230 kV power network, compared to threshold values for high-current failures in conventional power substations (e.g. higher than 160 A in a 230 kV power network). But for non-high current failures, such as motorization of a generator in a power plant, the value of about 5% of a nominal electric current of the power plant may be a significant value and hence a reasonable sign of such failures in the power plant. Accordingly, in an exemplary embodiment, current threshold $I_{CBF}$ may be set by a user. In an exemplary embodiment, first current $I_A$, second current $I_B$, and third current $I_C$ may be associated with a three-phase electric current, and the three-phase electric current may be associated with feeder 206. The three-phase electric current may be measured by a plurality of current transformers (CTs) coupled to each of the CBs. For example, a first CT 220 may be coupled to first CB 202, and a second CT 222 may be coupled to second CB 204.

In an exemplary embodiment, the energization condition may include an excitation removal tripping command $Bl_2$ received from power plant 208, and a first voltage $V_A$ being larger than a voltage threshold $V_{CBF}$. First voltage $V_A$ may be associated with feeder 206.

In an exemplary embodiment, the energization condition may include excitation removal tripping command $Bl_2$ received from power plant 208, and one of first voltage $V_A$, a second voltage $V_B$, and a third voltage $V_C$ being larger than voltage threshold $V_{CBF}$. In an exemplary embodiment, first voltage $V_A$, second voltage $V_B$, and third voltage $V_C$ may be associated with a three-phase voltage, and the three-phase voltage may be associated with feeder 206. The three-phase voltage may be measured by a voltage transformer (VT) 224 that is coupled to feeder 206. The three-phase voltage may be converted to a secondary voltage at a secondary terminal of VT 224. In an exemplary embodiment, voltage threshold $V_{CBF}$ may be set to about 50% of the secondary voltage of VT 224 as a sign of a voltage presence. Setting the threshold to a lower value may cause inaccurate voltage detection due to possible voltage measurement errors. In an exemplary embodiment, method 100 may be implemented on an exemplary circuit 228 for CBF protection, details of which are provided below with respect to FIG. 3. In an exemplary embodiment, circuit 228 may provide first stage tripping command 214, first second-stage tripping command 216, and second second-stage tripping command 218, based on the values of the three-phase voltage and the three-phase electric current.

Figure 3:
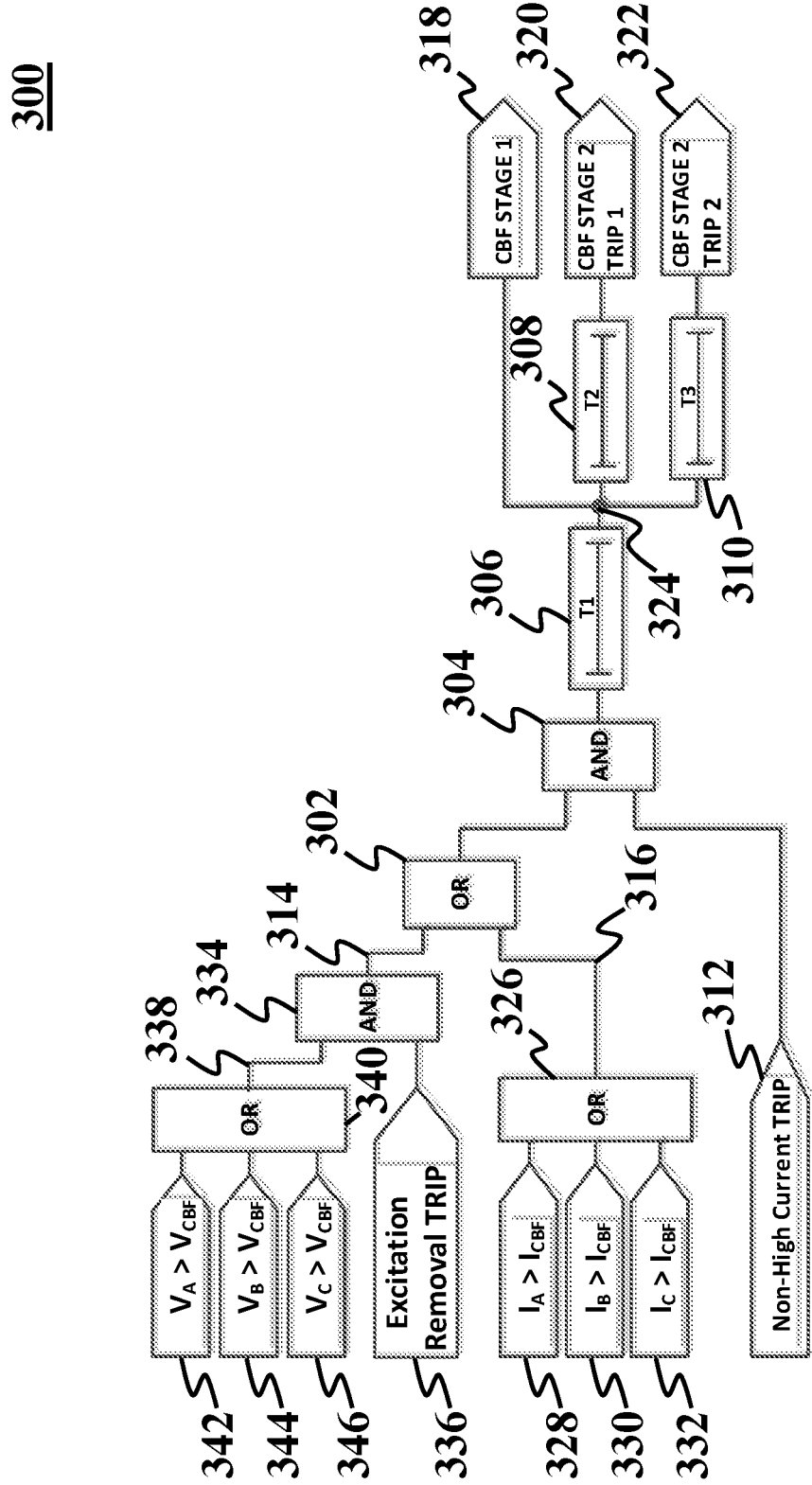
FIG. 3 shows a schematic of an exemplary circuit for CBF protection in an exemplary power substation, consistent with one or more exemplary embodiments of the present disclosure.

FIG. 3 shows a schematic of an exemplary circuit 300 for CBF protection in an exemplary power substation 200, consistent with one or more exemplary embodiments of the present disclosure. In an exemplary embodiment, circuit 300 may be similar to circuit 228. Referring to FIGS. 2 and 3, in an exemplary embodiment, circuit 300 may include a plurality of inputs, a plurality of outputs, a two-input OR gate 302, a first two-input AND gate 304, a first time-delay gate 306, a second time-delay gate 308, and a third time-delay gate 310. In an exemplary embodiment, the plurality of inputs may include a non-high current tripping input 312, an energization condition input 314, and a current condition input 316. In an exemplary embodiment, the plurality of outputs may include a first stage tripping output 318 coupled to first CB 202 and second CB 204, a first second-stage tripping output 320 coupled to the first plurality of CBs, and a second second-stage tripping output 322 coupled to the second plurality of CBs. In an exemplary embodiment, a first input of two-input OR gate 302 may be coupled to energization condition input 314, and a second input of two-input OR gate 302 may be coupled to current condition input 316. In an exemplary embodiment, a first input of first two-input AND gate 304 may be coupled to non-high current tripping input 312, and a second input of first two-input AND gate 304 may be coupled to an output of two-input OR gate 302. In an exemplary embodiment, first time-delay gate 306 may be configured to couple an output of first two-input AND gate 304 to a middle node 324 responsive to the output of first two-input AND gate 304 remaining active for at least a time T1 (which is different from II). In an exemplary embodiment, time T1 may be set longer than a dropping time of a terminal voltage of power plant 208 to voltage threshold $V_{CBF}$ after excitation removal tripping command $Bl_2$ is received from power plant 208. For example, if the dropping time of the terminal voltage to 0 is about 18 s, and supposing a constant reduction rate, and if voltage threshold $V_{CBF}$ is set to about 50% of the nominal voltage, time T1 may be set to about 9 s or above. In an exemplary embodiment, middle node 324 may be coupled to first stage tripping output 318. Second time-delay gate 308 may be configured to couple middle node 324 to first second-stage tripping output 320 responsive to middle node 324 remaining active for at least a time T2 (which is different from t2). In an exemplary embodiment, third time-delay gate 310 may be configured to couple middle node 324 to second second-stage tripping output 322 responsive to middle node 324 remaining active for at least a time T3 (which is different from t3). Times T1-T3 may have the following relationship with t1-t3:

$$t1 = T1, \quad \text{Equation (1a)}$$

$$t2 = T1 + T2, \quad \text{Equation (1b)}$$

$$t3 = T1 + T3, \quad \text{Equation (1c)}$$

In an exemplary embodiment, current condition input 316 may be activated responsive to first current $I_A$ being larger than current threshold $I_{CBF}$. Furthermore, current condition input 316 may be coupled to an output node of a first three-input OR gate 326. A first input of first three-input OR gate 326 may be coupled to a first Boolean input 328, and first Boolean input 328 may be activated responsive to first current $I_A$ being larger than current threshold $I_{CBF}$. A second input of first three-input OR gate 326 may be coupled to a second Boolean input 330, and second Boolean input 330 may be activated responsive to second current $I_B$ being larger than current threshold $I_{CBF}$. A third input of first three-input OR gate 326 may be coupled to a third Boolean input 332, and third Boolean input 332 may be activated responsive to third current $I_C$ being larger than current threshold $I_{CBF}$.

In an exemplary embodiment, energization condition input 314 may be coupled to an output node of a second two-input AND gate 334. A first input of second two-input AND gate 334 may be coupled to an excitation removal tripping input 336, and a second input of second two-input AND gate 334 may be coupled to a voltage condition input 338. In an exemplary embodiment, excitation removal tripping input 336 may be activated responsive to excitation removal tripping command $Bl_2$ received from power plant 208, and voltage condition input 338 may be activated responsive to a voltage condition being satisfied.

In an exemplary embodiment, the voltage condition may include first voltage $V_A$ being larger than voltage threshold $V_{CBF}$. Furthermore, voltage condition input 338 may be coupled to an output node of a second three-input OR gate 340. A first input of second three-input OR gate 340 may be coupled to a fourth Boolean input 342, and fourth Boolean input 342 may be activated responsive to first voltage $V_A$ being larger than voltage threshold $V_{CBF}$. A second input of second three-input OR gate 340 may be coupled to a fifth Boolean input 344, and fifth Boolean input 344 may be activated responsive to second voltage $V_B$ being larger than voltage threshold $V_{CBF}$. A third input of second three-input OR gate 340 may be coupled to a sixth Boolean input 346, and sixth Boolean input 346 may be activated responsive to third voltage $V_C$ being larger than voltage threshold $V_{CBF}$.

Figure 4:
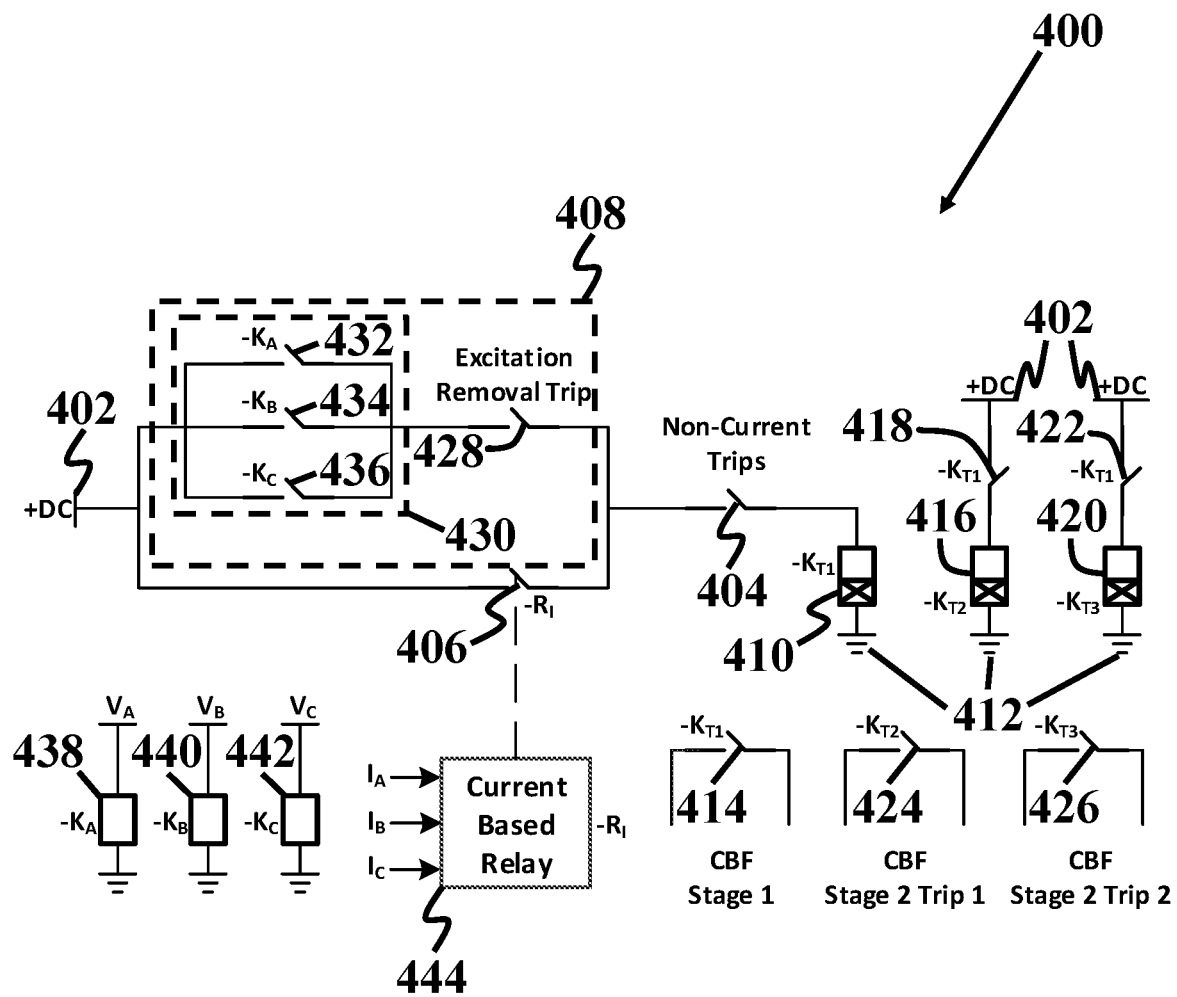
FIG. 4 shows a schematic of an exemplary circuit for CBF protection in an exemplary power substation, consistent with one or more exemplary embodiments of the present disclosure.

FIG. 4 shows a schematic of an exemplary circuit 400 for CBF protection in an exemplary power substation 200, consistent with one or more exemplary embodiments of the present disclosure. In an exemplary embodiment, circuit 400 may be similar to circuit 228. Referring to FIGS. 2 and 4, in an exemplary embodiment, circuit 400 may include a DC power supply 402, a non-high current switch 404, a current condition switch 406, a plurality of energization condition switches 408, and a first time-delay electromechanical relay 410. In an exemplary embodiment, first time-delay electromechanical relay 410 may be coupled to a reference point 412. In an exemplary embodiment, circuit 400 may be configured to couple DC power supply 402 to first time-delay electromechanical relay 410 responsive to non-high current switch 404 turned on, and one of current condition switch 406 and plurality of energization condition switches 408 turned on.

In an exemplary embodiment, first time-delay electromechanical relay 410 may be configured to activate a first stage contactor 414 responsive to first time-delay electromechanical relay 410 remaining coupled to DC power supply 402 for at least time T1, couple DC power supply 402 to a second time-delay electromechanical relay 416 by turning on a first time-delay switch 418 responsive to first time-delay electromechanical relay 410 remaining coupled to DC power supply 402 for at least time T1, and couple DC power supply 402 to a third time-delay electromechanical relay 420 by turning on a second time-delay switch 422 responsive to first time-delay electromechanical relay 410 remaining coupled to DC power supply 402 for at least time T1. In an exemplary embodiment, first stage contactor 414 may be associated with first CB 202 and second CB 204. In an exemplary embodiment, second time-delay electromechanical relay 416 and the third time-delay electromechanical relay 420 may be coupled to reference point 412.

In an exemplary embodiment, second time-delay electromechanical relay 416 may be configured to activate a first second-stage contactor 424 responsive to second time-delay electromechanical relay 416 remaining coupled to DC power supply 402 for at least time T2. In an exemplary embodiment, first second-stage contactor 424 may be associated with the first plurality of CBs.

In an exemplary embodiment, third time-delay electromechanical relay 420 may be configured to activate a second second-stage contactor 426 responsive to third time-delay electromechanical relay 420 remaining coupled to DC power supply 402 for at least time T3. In an exemplary embodiment, second second-stage contactor 426 may be associated with the second plurality of CBs.

In an exemplary embodiment, plurality of energization condition switches 408 may include an excitation removal switch 428 and a voltage-based switching mechanism 430 coupled to excitation removal switch 428. In an exemplary embodiment, excitation removal switch 428 may be configured to turn on responsive to an excitation removal tripping command received from power plant 208, and voltage-based switching mechanism 430 may be configured to turn on responsive to one of a first voltage-based switch 432, a second voltage-based switch 434, and a third voltage-based switch 436 turning on. In an exemplary embodiment, first voltage-based switch 432 may be controlled by a first electromechanical relay 438. In an exemplary embodiment, first electromechanical relay 438 may be configured to turn on first voltage-based switch 432 responsive to a first voltage $V_A$ of first electromechanical relay 438 becoming larger than voltage threshold $V_{CBF}$. In an exemplary embodiment, second voltage-based switch 434 may be controlled by a second electromechanical relay 440. In an exemplary embodiment, second electromechanical relay 442 may be configured to turn on second voltage-based switch 434 responsive to a second voltage $V_B$ of second electromechanical relay 440 becoming larger than voltage threshold $V_{CBF}$. In an exemplary embodiment, third voltage-based switch 436 may be controlled by a third electromechanical relay 442. In an exemplary embodiment, third electromechanical relay 442 may be configured to turn on third voltage-based switch 436 responsive to a third voltage $V_C$ of third electromechanical relay 442 becoming larger than voltage threshold $V_{CBF}$. In an exemplary embodiment, first voltage $V_A$, second voltage $V_B$, and third voltage $V_C$ may be associated with a three-phase voltage, and the three-phase voltage may be associated with feeder 206.

In an exemplary embodiment, current condition switch 406 may be controlled by a current-based relay 444. In an exemplary embodiment, current-based relay 444 may be configured to turn on current condition switch 406 responsive to one of first current $I_A$, second current $I_B$, and a third current $I_C$ being larger than current threshold $I_{CBF}$.

Example 1

Figure 5:
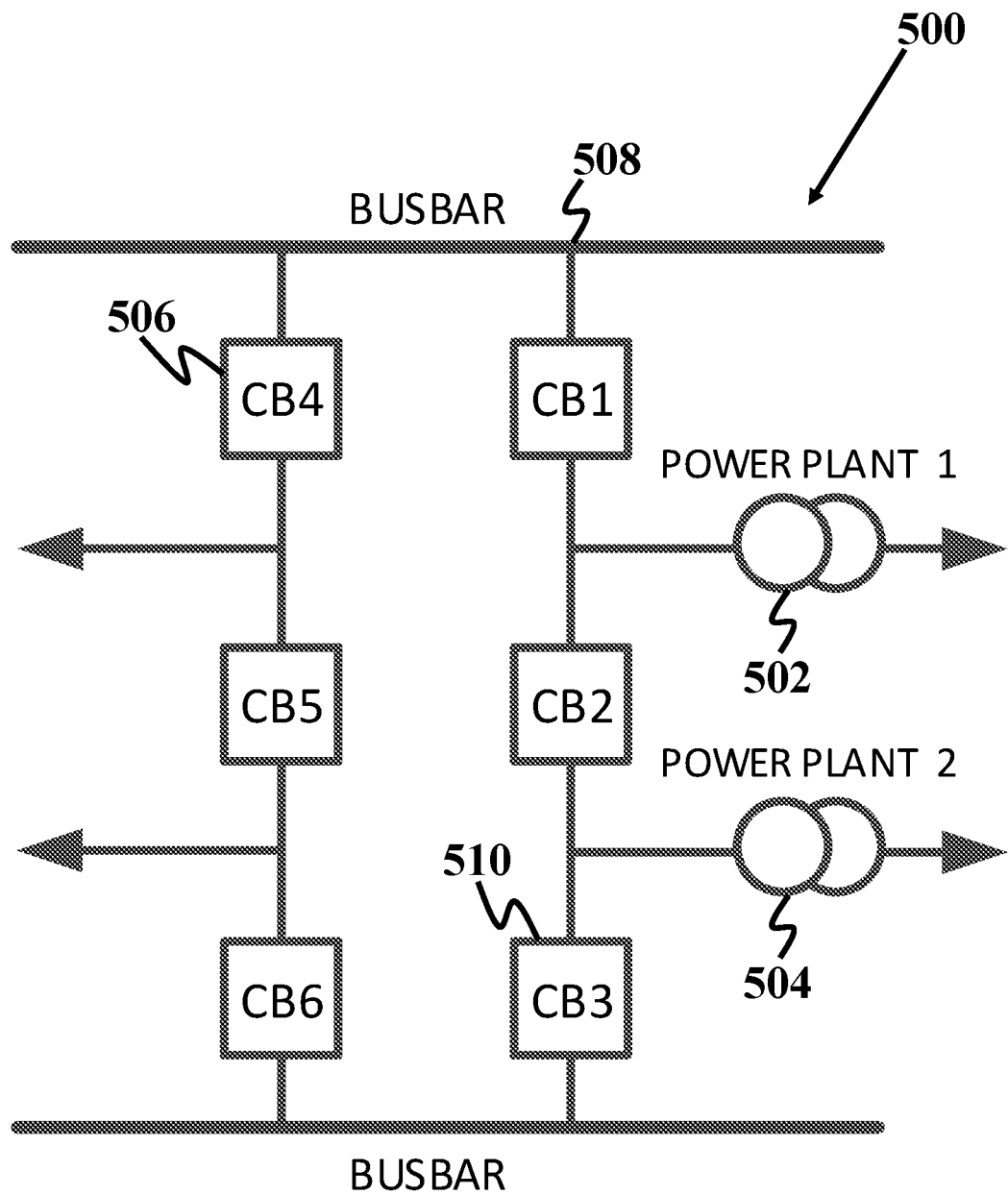
FIG. 5 shows an exemplary power substation coupled to two power plants, consistent with one or more exemplary embodiments of the present disclosure.

In this example, CBF protection of an exemplary substation according to an exemplary implementation of method 100 is demonstrated. FIG. 5 shows an exemplary power substation 500 coupled to two power plants 502 and 504, in which power plant 502 is faulty, consistent with one or more exemplary embodiments of the present disclosure. In an exemplary implementation of method 100, time T2 is selected shorter than time T3, so that first second-stage tripping command 216 is sent to the first plurality of CBs (e.g. a CB 506) via a busbar 508 before sending second second-stage tripping command 218 to the second plurality of CBs (e.g. a CB 510). As a result, if one or more of the first plurality of CBs malfunction, power plant 504 may not be unnecessarily disconnected from the power network because power plant 504 is connected to the power network via the second plurality of CBs.

Example 2

Figure 6:
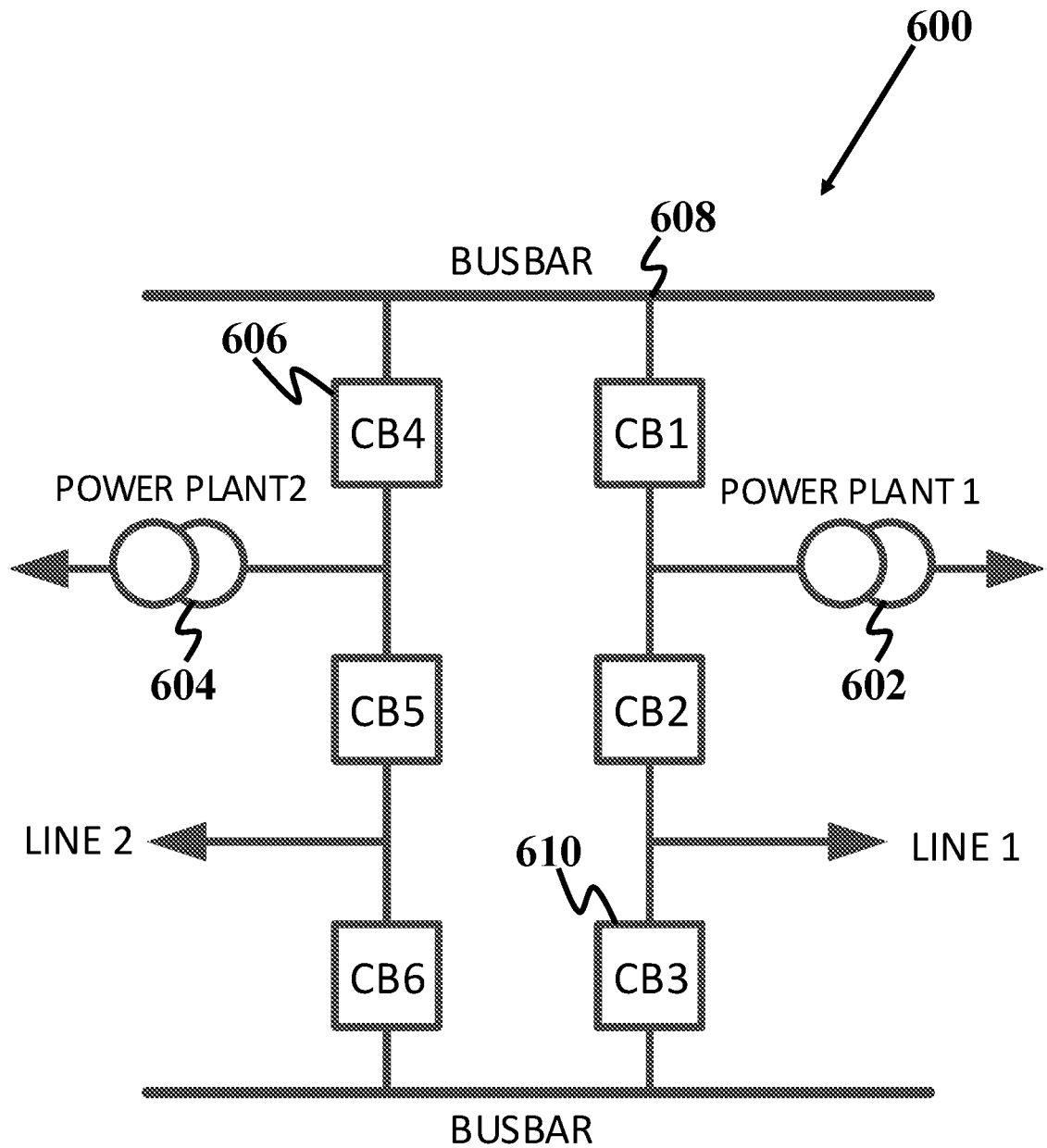
FIG. 6 shows an exemplary power substation coupled to two power plants, consistent with one or more exemplary embodiments of the present disclosure.

In this example, CBF protection of an exemplary substation according to an exemplary implementation of method 100 is demonstrated. FIG. 6 shows an exemplary power substation 600 coupled to two power plants 602 and 604, in which power plant 602 is faulty, consistent with one or more exemplary embodiments of the present disclosure. In an exemplary implementation of method 100, time T2 is selected longer than time T3, so that first second-stage tripping command 216 is sent to the first plurality of CBs (e.g. a CB 606) via a busbar 608 after sending second second-stage tripping command 218 to the second plurality of CBs (e.g. a CB 610). As a result, if one or more of the second plurality of CBs malfunction, power plant 604 may remain connected to the power network via the first plurality of CBs (e.g. CB 606).

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for circuit breaker failure (CBF) protection in a power substation comprising a first circuit breaker (CB), a second CB coupled to the first CB, a feeder coupled to the first CB and the second CB, a power plant coupled to the feeder, a first plurality of CBs coupled to the first CB, and a second plurality of CBs coupled to the second CB, the method comprising:
   sending a first stage tripping command to the first CB and the second CB to trip the first CB and the second CB responsive to a non-high current tripping command being active for a first period of time and responsive to one of a current condition and an energization condition being satisfied for the first period of time;
   sending a first second-stage tripping command to the first plurality of CBs to trip the first plurality of CBs responsive to the non-high current tripping command being active for a second period of time and responsive to one of the current condition and the energization condition being satisfied for the second period of time, the second period of time being longer than the first period of time; and
   sending a second second-stage tripping command to the second plurality of CBs to trip the second plurality of CBs responsive to the non-high current tripping command being active for a third period of time and responsive to one of the current condition and the energization condition being satisfied for the third period of time, the third period of time being longer than the first period of time.

2. The method of claim 1, wherein the current condition comprises a first current being larger than a current threshold, the first current associated with the feeder.

3. The method of claim 2, wherein the current threshold is set in a range of 4% to 6% of a nominal electric current of the power plant.

4. The method of claim 1, wherein the current condition comprises one of a first current, a second current, and a third current being larger than a current threshold, the first current, the second current, and the third current associated with a three-phase electric current, the three-phase electric current associated with the feeder.

5. The method of claim 1, wherein the energization condition comprises an excitation removal tripping command received from the power plant and a first voltage being larger than a voltage threshold, the first voltage associated with the feeder.

6. The method of claim 5, wherein the first period of time is set higher than a dropping time of a terminal voltage of the power plant after the excitation removal tripping command is received from the power plant.

7. The method of claim 1, wherein the energization condition comprises an excitation removal tripping command received from the power plant, and one of a first voltage, a second voltage, and a third voltage being larger than a voltage threshold, the first voltage, the second voltage, and the third voltage associated with a three-phase voltage, the three-phase voltage associated with the feeder.

8. A circuit for circuit breaker failure (CBF) protection in a power substation comprising a first circuit breaker (CB), a second CB coupled to the first CB, a feeder coupled to the first CB and the second CB, a power plant coupled to the feeder, a first plurality of CBs coupled to the first CB, and a second plurality of CBs coupled to the second CB, the circuit comprising:
   a plurality of inputs, comprising:
      a non-high current tripping input;
      an energization condition input; and
      a current condition input;
   a plurality of outputs, comprising:
      a first stage tripping output coupled to the first CB and the second CB;
      a first second-stage tripping output coupled to the first plurality of CBs; and
      a second second-stage tripping output coupled to the second plurality of CBs;
   a two-input OR gate, a first input of the two-input OR gate coupled to the energization condition input, and a second input of the two-input OR gate coupled to the current condition input;
   a first two-input AND gate, a first input of the first two-input AND gate coupled to the non-high current tripping input, and a second input of the first two-input AND gate coupled to an output of the two-input OR gate;
   a first time-delay gate configured to couple an output of the first two-input AND gate to a middle node responsive to the output of the first two-input AND gate remaining active for at least a time T1, the middle node coupled to the first stage tripping output;
   a second time-delay gate configured to couple the middle node to the first second-stage tripping output responsive to the middle node remaining active for at least a time T2; and
   a third time-delay gate configured to couple the middle node to the second second-stage tripping output responsive to the middle node remaining active for at least a time T3.

9. The circuit of claim 8, wherein the current condition input is configured to be activated responsive to a first current being larger than a current threshold, the first current associated with the feeder.

10. The circuit of claim 8, wherein the current condition input is coupled to an output node of a first three-input OR gate, wherein:
   a first input of the first three-input OR gate is coupled to a first Boolean input, the first Boolean input is configured to be activated responsive to a first current being larger than a current threshold;
   a second input of the first three-input OR gate is coupled to a second Boolean input, the second Boolean input is configured to be activated responsive to a second current being larger than the current threshold; and
   a third input of the first three-input OR gate is coupled to a third Boolean input, the third Boolean input is configured to be activated responsive to a third current being larger than the current threshold;
   wherein the first current, the second current, and the third current are associated with a three-phase electric current, the three-phase electric current associated with the feeder.

11. The circuit of claim 8, wherein the energization condition input is coupled to an output node of a second two-input AND gate, a first input of the second two-input AND gate coupled to an excitation removal tripping input, and a second input of the second two-input AND gate coupled to a voltage condition input, the excitation removal tripping input is configured to be activated responsive to an excitation removal tripping command received from the power plant, and the voltage condition input is configured to be activated responsive to a voltage condition being satisfied.

12. The circuit of claim 11, wherein the voltage condition comprises a first voltage being larger than a voltage threshold, the first voltage associated with the feeder.

13. The circuit of claim 12, wherein the voltage threshold is set to 50 percent of a nominal value of a secondary voltage at a secondary terminal of a voltage transformer (VT) coupled to the feeder, the VT configured to measure a value of the first voltage.

14. The circuit of claim 11, wherein the voltage condition input is coupled to an output node of a second three-input OR gate, wherein:
- a first input of the second three-input OR gate is coupled to a fourth Boolean input, the fourth Boolean input is configured to be activated responsive to a first voltage being larger than a voltage threshold;
- a second input of the second three-input OR gate is coupled to a fifth Boolean input, the fifth Boolean input is configured to be activated responsive to a second voltage being larger than the voltage threshold; and
- a third input of the second three-input OR gate is coupled to a sixth Boolean input, the sixth Boolean input is configured to be activated responsive to a third voltage being larger than the voltage threshold;
- wherein the first voltage, the second voltage, and the third voltage are associated with a three-phase voltage, the three-phase voltage associated with the feeder.

15. A circuit for circuit breaker failure (CBF) protection in a power substation comprising a first circuit breaker (CB), a second CB coupled to the first CB, a feeder coupled to the first CB and the second CB, a power plant coupled to the feeder, a first plurality of CBs coupled to the first CB, and a second plurality of CBs coupled to the second CB, the circuit comprising:
- a DC power supply;
- a non-high current switch;
- a current condition switch;
- a plurality of energization condition switches; and
- a first time-delay electromechanical relay coupled to a reference point;
- wherein the circuit is configured to couple the DC power supply to the first time-delay electromechanical relay responsive to the non-high current switch being turned on and responsive to one of the current condition switch and the plurality of energization condition switches being turned on.

16. The circuit of claim 15, wherein the first time-delay electromechanical relay is configured to:
- activate a first stage contactor responsive to the first time-delay electromechanical relay remaining coupled to the DC power supply for at least a time T1, the first stage contactor associated with the first CB and the second CB;
- couple the DC power supply to a second time-delay electromechanical relay by turning on a first time-delay switch responsive to the first time-delay electromechanical relay remaining coupled to the DC power supply for at least the time T1, the second time-delay electromechanical relay coupled to the reference point; and
- couple the DC power supply to a third time-delay electromechanical relay by turning on a second time-delay switch responsive to the first time-delay electromechanical relay remaining coupled to the DC power supply for at least the time T1, the third time-delay electromechanical relay coupled to the reference point.

17. The circuit of claim 16, wherein the second time-delay electromechanical relay is configured to activate a first second-stage contactor responsive to the second time-delay electromechanical relay remaining coupled to the DC power supply for at least a time T2, the first second-stage contactor associated with the first plurality of CBs.

18. The circuit of claim 16, wherein the third time-delay electromechanical relay is configured to activate a second second-stage contactor responsive to the third time-delay electromechanical relay remaining coupled to the DC power supply for at least a time T3, the second second-stage contactor associated with the second plurality of CBs.

19. The circuit of claim 15, wherein the plurality of energization condition switches comprise:
- an excitation removal switch configured to turn on responsive to an excitation removal tripping command received from the power plant; and
- a voltage-based switching mechanism coupled to the excitation removal switch, the voltage-based switching mechanism configured to turn on responsive to one of a first voltage-based switch, a second voltage-based switch, and a third voltage-based switch turning on, wherein:
  - the first voltage-based switch is controlled by a first electromechanical relay, the first electromechanical relay configured to turn on the first voltage-based switch responsive to a first voltage of the first electromechanical relay becoming larger than a voltage threshold;
  - the second voltage-based switch is controlled by a second electromechanical relay, the second electromechanical relay configured to turn on the second voltage-based switch responsive to a second voltage of the second electromechanical relay becoming larger than the voltage threshold; and
  - the third voltage-based switch is controlled by a third electromechanical relay, the third electromechanical relay configured to turn on the third voltage-based switch responsive to a third voltage of the third electromechanical relay becoming larger than the voltage threshold,
  - wherein the first voltage, the second voltage, and the third voltage are associated with a three-phase voltage, the three-phase voltage associated with the feeder.

20. The circuit of claim 15, wherein the current condition switch is controlled by a current-based relay, the current-based relay configured to turn on the current condition switch responsive to one of a first current, a second current, and a third current becoming larger than a current threshold, the first current, the second current, and the third current associated with a three-phase electric current, the three-phase electric current associated with the feeder.

* * * * *